(12) United States Patent
Komatsu et al.

(10) Patent No.: US 10,392,138 B2
(45) Date of Patent: Aug. 27, 2019

(54) METHOD OF FILLING VISCOUS CONTENT

(71) Applicants: Toyo Seikan Co., Ltd., Tokyo (JP); TOYO SEIKAN GROUP HOLDINGS, LTD., Tokyo (JP)

(72) Inventors: Ikuo Komatsu, Yokohama (JP); Yosuke Akutsu, Yokohama (JP)

(73) Assignees: TOYO SEIKAN CO., LTD., Tokyo (JP); TOYO SEIKAN GROUP HOLDINGS, LTD., Tokyo (JP)

( * ) Notice: Subject to any disclaimer, the term of this patent is extended or adjusted under 35 U.S.C. 154(b) by 309 days.

(21) Appl. No.: 15/300,407

(22) PCT Filed: Mar. 19, 2015

(86) PCT No.: PCT/JP2015/058239
§ 371 (c)(1),
(2) Date: Sep. 29, 2016

(87) PCT Pub. No.: WO2015/159643
PCT Pub. Date: Oct. 22, 2015

(65) Prior Publication Data
US 2017/0144783 A1    May 25, 2017

(30) Foreign Application Priority Data

Apr. 18, 2014  (JP) ................................ 2014-086530
May 30, 2014   (JP) ................................ 2014-112677

(51) Int. Cl.
*B65B 3/00*       (2006.01)
*B65B 3/04*       (2006.01)
(Continued)

(52) U.S. Cl.
CPC ................ *B65B 3/04* (2013.01); *A23L 21/10* (2016.08); *A23L 27/60* (2016.08); *B65B 3/00* (2013.01);
(Continued)

(58) Field of Classification Search
CPC . B65B 3/04; A23L 27/60; A23L 21/10; B65D 1/32; B65D 23/02; B65D 1/0215; B65D 1/40; B65D 25/14
(Continued)

(56) References Cited

U.S. PATENT DOCUMENTS 7,877,968 B2 *  2/2011  Kim ..................... B65B 61/00
                                                     53/473
8,535,779 B1 *  9/2013  Smith .................. B65D 23/02
                                                     428/141
(Continued)

FOREIGN PATENT DOCUMENTS

EP     1992420 A1    11/2008
JP     6-76061 U     10/1994
(Continued)

OTHER PUBLICATIONS

International Search Report for PCT/JP2015/058239 dated Jun. 23, 2015.
(Continued)

*Primary Examiner* — Andrew M Tecco
*Assistant Examiner* — Praachi M Pathak
(74) *Attorney, Agent, or Firm* — Sughrue Mion, PLLC

(57) ABSTRACT

A method of filling a container with a viscous content by providing a container that has an inner surface formed by using a thermoplastic resin and, specifically, an olefin resin, applying an edible oil or a liquid paraffin on the inner surface of the container to form an oil film thereon, and filling the container that has the oil film formed on the inner surface thereof with a viscous content that has a viscosity at 25° C. of not less than 100 mPa·s.

4 Claims, 1 Drawing Sheet

(51) Int. Cl.
| | |
|---|---|
| *A23L 27/60* | (2016.01) |
| *B65D 1/02* | (2006.01) |
| *B65D 1/32* | (2006.01) |
| *B65D 85/72* | (2006.01) |
| *A23L 21/10* | (2016.01) |
| *B65D 23/02* | (2006.01) |
| *B65D 35/08* | (2006.01) |
| *B65D 35/44* | (2006.01) |
| *B65D 41/34* | (2006.01) |
| *C09D 5/00* | (2006.01) |
| *C09D 191/00* | (2006.01) |
| *B65B 29/00* | (2006.01) |
| *B65B 61/00* | (2006.01) |
| *B65D 25/14* | (2006.01) |
| *B67C 3/22* | (2006.01) |
| *B65B 13/18* | (2006.01) |
| *B65B 13/22* | (2006.01) |
| *B65B 65/02* | (2006.01) |

(52) U.S. Cl.
CPC ............ *B65B 13/18* (2013.01); *B65B 13/185* (2013.01); *B65B 13/22* (2013.01); *B65B 29/00* (2013.01); *B65B 61/00* (2013.01); *B65B 65/02* (2013.01); *B65D 1/02* (2013.01); *B65D 1/0215* (2013.01); *B65D 1/0246* (2013.01); *B65D 1/0276* (2013.01); *B65D 1/32* (2013.01); *B65D 23/02* (2013.01); *B65D 25/14* (2013.01); *B65D 35/08* (2013.01); *B65D 35/44* (2013.01); *B65D 41/3495* (2013.01); *B65D 85/72* (2013.01); *B67C 3/22* (2013.01); *C09D 5/00* (2013.01); *C09D 191/00* (2013.01); *A23V 2002/00* (2013.01); *B65D 2231/005* (2013.01); *B65D 2251/0015* (2013.01); *B65D 2251/0093* (2013.01)

(58) Field of Classification Search
USPC ............ 215/12.1, 12.2; 428/35.7, 35.1, 35.9, 428/424.2, 441, 475.8, 500; 220/62.22, 220/62.12, 62.11
See application file for complete search history.

(56) References Cited

U.S. PATENT DOCUMENTS

| | | | |
|---|---|---|---|
| 2008/0283483 A1* | 11/2008 | Kim | .................. B65D 23/02 215/12.2 |
| 2008/0286480 A1 | 11/2008 | Kim et al. | |
| 2010/0092621 A1 | 4/2010 | Akutsu et al. | |
| 2015/0108032 A1* | 4/2015 | Akutsu | .................. B65D 23/02 206/524.4 |
| 2017/0101217 A1* | 4/2017 | Akutsu | .................. B65B 39/00 |

FOREIGN PATENT DOCUMENTS

| | | |
|---|---|---|
| JP | 6-345903 A | 12/1994 |
| JP | 7-132901 A | 5/1995 |
| JP | 2001-048229 A | 2/2001 |
| JP | 2007-284066 A | 11/2007 |
| JP | 2008-222291 A | 9/2008 |
| JP | 2009-214914 A | 9/2009 |
| WO | 2010/103985 A1 | 9/2010 |

OTHER PUBLICATIONS

Communication dated Nov. 15, 2017, from the European Patent Office in counterpart European Application No. 15780663.9.

\* cited by examiner

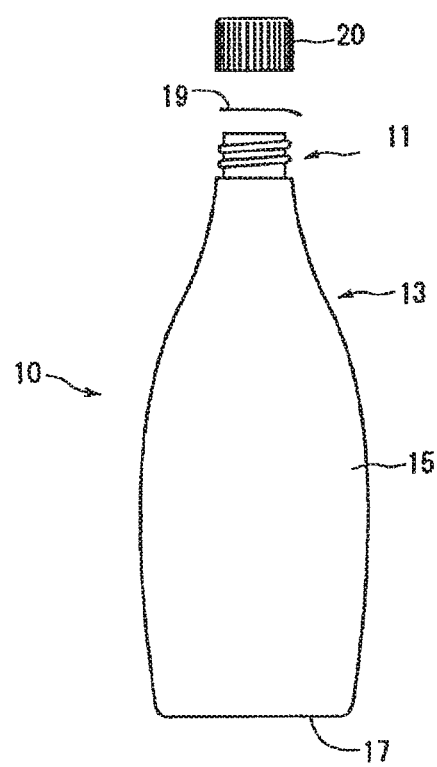

METHOD OF FILLING VISCOUS CONTENT

TECHNICAL FIELD

This invention relates to a method of filling a container with a viscous content.

BACKGROUND ART

Plastic containers are easy to form, can be inexpensively produced and have, therefore, been widely used in a variety of applications. Specifically, an olefin resin container of the shape of a bottle of which the inner wall surface is formed by using an olefin resin such as low-density polyethylene and which is formed by direct blow-forming, has been desirably used as a container for containing viscous slurry-like or paste-like contents such as mayonnaise and ketchup from such a standpoint that the content can be easily squeezed out.

However, the above viscous content tends to adhere and remain on the inner surface of the container and it is difficult to use the content filled in the container up to its last drip. Namely, this kind of problem occurs due to lack of slide-down property on the inner surface of the container for the viscous content.

As a container that meets the above requirement, a patent document 1, for example, is proposing a bottle of a multi-layered structure including an innermost layer of an olefin resin that has an MFR (melt flow rate) of not less than 10 g/10 min.

The bottle of the multilayered structure includes the innermost layer that has excellent wettability to the oily content. Therefore, if the bottle is inverted or is tilted, then the oily content such as mayonnaise or the like falls down spreading along the surface of the innermost layer and can be completely discharged without adhering or remaining on the inner wall surface of the bottle (on the surface of the innermost layer).

As for the bottles for containing viscous non-oily contents in which plant fibers are dispersed in water like ketchup, a patent document 2 and a patent document 3 are proposing polyolefin resin bottles having an innermost layer which is blended with a saturated or unsaturated aliphatic amide as a lubricating agent.

The above patent documents 1 to 3 are all trying to improve slipping property of the plastic containers for the contents based on the chemical compositions of the thermoplastic resin compositions forming the inner surfaces of the containers, and are achieving improvements in the slipping property to some extent. However, limitation is imposed on improving the slipping property due to limitation on the kinds of the thermoplastic resins that are used and on the additives, and striking improvement has not been achieved yet.

On the other hand, a patent document 4 is proposing a packing material comprising a composition that contains an additive having an HLB of not more than 5.0 in an amount in a range of 0.3 to 3 parts by weight per 100 parts by weight of the polyolefin resin.

Further, the present applicant has previously proposed a container of which the inner surface or the surface that comes in contact with the content is a liquid permeable surface and which is holding a liquid in the liquid permeable surface (Japanese Patent Application No. 2012-199236) and a container of which the inner surface is formed by using a resin composition that contains a resin for forming and a liquid (liquid immiscible with the content (Japanese Patent Application No. 2013-23468). These containers are forming a liquid film at portions that come in contact with the content, and exhibit very improved slipping property for the fluid contents such as ketchup, sauce, mayonnaise and the like.

However, these containers are still accompanied by a problem in regard to stably holding the liquid film that is formed to improve slipping property for the content, and further improvements are necessary.

PRIOR ART DOCUMENTS

Patent Documents

Patent document 1: JP-A-2007-284066
Patent document 2: JP-A-2008-222291
Patent document 3: JP-A-2009-214914
Patent document 4: JP-A-6-345903

OUTLINE OF THE INVENTION

Problems that the Invention is to Solve

It is, therefore, an object of the present invention to provide a method of filling a container with a viscous content in a manner that the content can be quickly discharged out of the container.

Another object of the present invention is to provide a method of filling a container with a viscous content in a manner that the container stably sustains the effect of quickly discharging the viscous content out of the container.

Means for Solving the Problems

According to the present invention, there is provided a method of filling a viscous content by:
providing a container that has an inner surface formed by using a thermoplastic resin;
applying an edible oil or a liquid paraffin on the inner surface of the container to form an oil film thereon; and
filling the container that has the oil film formed on the inner surface thereof with a viscous content that has a viscosity at 25° C. of not less than 100 mPa·s.

In the filling method of the present invention, it is desired that:
(1) The thermoplastic resin forming the inner surface of the container is an olefin resin;
(2) The amount of the oil film is in a range of 5 to 60 g/m$^2$;
(3) The thermoplastic resin forming the inner surface of the container is blended with a bleeding additive;
(4) An ester of fatty acid is used as the bleeding additive;
(5) The bleeding additive is added in an amount of 0.5 to 5.0 parts by weight per 100 parts by weight of the thermoplastic resin; and
(6) The container has a multilayered structure including an inner surface layer that is formed by using the olefin resin.

Effects of the Invention

According to the method of filling a viscous content of the present invention, an oil film of edible oil or liquid paraffin is formed between the inner surface of the container and the viscous content filled in the container. Namely, the oil film is made present between the content and the inner surface of the container. As a result, the viscous content is discharged out of the container while coming in contact with the oil film without, however, coming in contact with the inner surface of the container. This accounts for an improved slipping property (falling property) for the viscous content, effectively suppressing the viscous content from being adsorbed by the inner surface of the container, and enabling the viscous content to be quickly discharged without adhering or remaining on the inner surface of the container.

Besides, in the invention, the oil film is formed and the viscous content is filled through a series of steps without a blank of long time from the step of forming the oil film until the step of filling the viscous content. This, therefore, effectively alleviates such an inconvenience that the oil film separates away due to its own weight from the inner surface of the container. Namely, the oil film that is formed is held by the viscous content that is filled in the container.

Therefore, the present invention stably exhibits an improved effect for discharging the content based on the formation of the oil film.

In the present invention, further, the thermoplastic resin forming the inner surface of the container is blended with the bleeding additive to more stably maintain the oil film. Namely, upon forming the inner surface of the container by using the thermoplastic resin blended with the bleeding additive, the bleeding additive is segregated on the surface, the liquid (edible oil or liquid paraffin) forming the oil film is prevented by the segregated bleeding additive from infiltrating into the wall of the container thereby effectively alleviating such an inconvenience that the amount of the oil film continues to decrease.

DESCRIPTION OF THE DRAWING

FIG. 1 is a view of a directly blow-formed bottle which is the most preferred embodiment of a container for which the filling method of the present invention is applied, the bottle being in an empty state.

MODES FOR CARRYING OUT THE INVENTION

The method of filling a viscous content of the present invention is executed by a process of providing a container that has a predetermined structure, forming an oil film of edible oil or liquid paraffin on the inner surface of the container, and filling the container with a viscous content.
<Contents in the Container>

The content that is to be contained in the container of the present invention is a viscous content having a viscosity of not less than 100 mPa·s at 25° C. Namely, the viscous content adheres to the inner wall surface of the container and cannot be completely discharged or cannot be easily spent up to its last drop. The filling method of the present invention, however, enables the content to be discharged to a very high degree.

Further, the viscous content may assume any form such as emulsified product or non-emulsified product. Concrete examples thereof include mayonnaise, ketchup, various sauces (Worcester sauce, Semi-sweet sauce, etc.), aqueous paste, honey, mayonnaise, mustard, dressing, jam, chocolate syrup, cosmetic solution such as lotion, liquid detergent, shampoo, rinse and the like.

Among the above, emulsified products such as mayonnaise and, specifically, among the oil-in-water emulsified products, those having an oil (lipid) content of not more than 50% can be particularly effectively treated by the filling method of the present invention. Namely, with the emulsified product having a large oil content, an excess of oil content forms the oil film on the inner wall surface of the container. As a result, a high slipping property is exhibited and the content can be discharged relatively highly efficiently. On the other hand, the product having a small oil content is not capable of forming the oil film, and the content can be discharged little efficiently.
<Container>

In the invention, the container to be filled with the viscos content is the one having an inner surface that is formed by using a thermoplastic resin. This is because the container having the inner surface formed by using the thermoplastic resin is suited for holding, on the inner surface thereof, an edible oil or a liquid paraffin that will be described later, and enables an oil film to be easily formed thereon.

There is no specific limitation on the thermoplastic resin provided it is capable of forming an inner surface of the container. Examples thereof include low-density polyethylene, high-density polyethylene, polypropylene, poly 1-butene, poly 4-methyl-1-pentene, or random or block copolymer of α-olefins like ethylene, propylene, 1-butene or 4-methyl-1-pentene, or cyclic olefin copolymers (such as those disclosed in JP-A-2007-284066); ethylene.vinyl copolymers, such as ethylene.vinyl acetate copolymer, ethylene.vinyl alcohol copolymer and ethylene.vinyl chloride copolymer; styrene resins such as polystyrene, acrylonitrile.styrene copolymer, ABS and α-methylstyrene.styrene copolymer; polyvinyl resins such as polyvinyl chloride, polyvinylidene chloride, vinyl chloride.vinylidene chloride copolymer, poly(methyl acrylate) and poly(methyl methacrylate); polyamide resins such as nylon 6, nylon 6-6, nylon 6-10, nylon 11 and nylon 12; polyester resins such as polyethylene terephthalate, polybutylene terephthalate, polyethylene naphthalate as well as copolymerized polyesters thereof;

polycarbonate resins; polyphenylene oxide resins; and biodegradable resins such as polylactic acid and the like.

Among them, the olefin resin and the polyester resin are suited from the standpoint of their excellent properties of when they are formed into the inner surface of the container. Specifically, the olefin resin is not only suited for holding the oil film but also rich in flexibility, and can be particularly desirably used for forming directly blow-formed bottles for favorably squeezing out a viscous content contained there. Among them, the low-density polyethylene (LDPE) is best suited.

In the invention, further, it is desired that the thermoplastic resin for forming the inner surface of the container is blended with a bleeding additive. Namely, in the invention, the oil film of an edible oil or a liquid paraffin is formed on the surface of the container prior to filling the content. Here, if the bleeding additive has been added to the thermoplastic resin as represented by the olefin resin, the additive that has bled on the inner surface of the container effectively suppresses the infiltration of the edible oil or the liquid paraffin into the container, enabling the oil film to be stably maintained over extended periods of time.

As such a bleeding additive, there can be used the one that favorably disperses in the thermoplastic resin and exhibits bleeding property. Representative examples are the compounds that have been used as so-called lubricants, i.e., hydrocarbon type lubricants such as paraffin wax, polyethylene wax, liquid paraffin and synthetic paraffin; aliphatic lubricants such as stearyl alcohol, stearic acid, and 12-hydroxystearic acid; fatty acid amide type lubricants such as stearamide, oleamide, erucamide, methylenebis(stearamide) and ethylenebis(stearamide); metal soap type lubricants such as calcium stearate, zinc stearate, magnesium stearate, lead stearate, aluminum stearate, barium stearate, barium stearate/zinc complex and zinc stearate/calcium stearate complex; fatty acid ester type surfactants such as cured fat and oil, glycerin monostearate, butyl stearate, pentaerythritol tetrastearate, stearyl stearate, ester of glycerin fatty acid, ester of sorbitan fatty acid (C8 to C22), ester of propylene glycol fatty acid (C8 to C22), ester of sucrose fatty acid (C8 to C22) and ester of pentaerythritol fatty acid (C8 to C18); and fatty acid ether type surfactants such as polyethylene glycol and polypropylene glycol (numerals in parentheses represent the numbers of carbon atoms of the fatty acids forming esters).

In the invention, the bleeding additive is added to the thermoplastic resin and, particularly desirably, to the olefin resin that forms the inner surface of the container from the standpoint of highly suppressing the infiltration of the oil film. Therefore, an ester of fatty acid is, particularly preferably, used as the bleeding additive. That is, the ester of fatty acid is highly affinitive to, specifically, the edible oil or the liquid paraffin that forms the oil film, and works to highly hold the oil film.

The above bleeding additive is, usually, used in an amount of 0.5 to 5.0 parts by weight and, specifically, 1.0 to 3.0 parts by weight per 100 parts by weight of the thermoplastic resin. If the amount thereof is small, the desired effect is not fully exhibited for holding the oil film. On the other hand, even if the bleeding additive is used in excess amounts, the effect for holding the oil film is not improved any further but rather the quality of the content is adversely affected or the thermoplastic resin forming the inner surface of the container exhibits deteriorated properties.

The above-mentioned container can assume a variety of forms so far as the inner surface is formed by using the above thermoplastic resin. For instance, it may be in the form of a paper container having a layer of the thermoplastic resin laminated on the inner surface thereof, or a metal container forming thereon a polyester layer such as of PET. Usually, however, the container is, preferably, a plastic container having an inner surface formed by using a thermoplastic resin, and is used for containing a viscous content.

So far as the container has the inner wall formed by using the thermoplastic resin, the container wall of the container may be of a single-layer structure of the thermoplastic resin or a multilayered structure combined with any other thermoplastic resin.

For instance, the container wall may be of the multilayered structure including, as an intermediate layer, an oxygen-barrier layer or an oxygen absorption layer, to improve oxygen-barrier property and, therefore, to effectively avoid oxidation and deterioration of the content in the container caused by oxygen that has permeated through. Specifically, if the inner and outer layers of the container are formed by using the olefin resin or the polyester resin, it is desired to employ the multilayered structure.

The oxygen-barrier layer is a layer that contains an oxygen barrier resin, and works to physically shut off the passage of oxygen. As the oxygen barrier resin, there can be represented a resin having an oxygen permeation coefficient at 23° C.-0% RH of not more than 10 cc·20 μm/m²/sec/atm, such as ethylene-vinyl alcohol copolymer or polyamide. Specifically, the ethylene-vinyl alcohol copolymer is most desired since it exhibits very excellent oxygen barrier property.

As the ethylene-vinyl alcohol copolymer (saponified product of ethylene-vinyl acetate copolymer), concretely, there is preferably used a saponified product of a copolymer that is obtained by saponifying an ethylene-vinyl acetate copolymer having an ethylene content of 20 to 60 mol % and, specifically, 25 to 50 mol % such that the degree of saponification thereof is not less than 96% and, specifically, not less than 99 mol %. The ethylene-vinyl alcohol copolymer (hereinafter often called EVOH) must have a molecular weight large enough for forming a film and, usually, has an intrinsic viscosity of not less than 0.01 dl/g and, specifically, not less than 0.05 dl/g as measured in a mixed solvent of phenol/water of a weight ratio of 85/15 at 30° C.

In the oxygen-barrier layer, further, the oxygen barrier resin may be blended with the olefin resin so far as excellent oxygen barrier property of the oxygen barrier resin is not impaired. Specifically, the EVOH has poor adhesiveness to the olefin resin. Upon being blended with the thermoplastic resin such as olefin resin that forms the inner surface of the container, however, the adhesiveness can be improved to the layer of the thermoplastic resin such as the olefin resin forming the inner surface of the container. For example, if the olefin resin is blended in an amount of 5 to 65 parts by weight per 100 parts by weight of the EVOH, the adhesiveness can be improved without impairing the oxygen barrier property and making it possible to laminate the oxygen-barrier layer directly on the olefin resin layer that is forming the inner surface of the container.

The oxygen-absorbing resin layer is to complement the oxygen barrier property, and includes an oxidizing polymer and a transition metal catalyst as described in JP-A-2002-240813. By the action of the transition metal catalyst, the oxidizing polymer is oxidized with oxygen; i.e., oxygen is absorbed and permeation of oxygen is interrupted.

The oxidizing polymer and the transition metal catalyst have been closely described in the above JP-A-2002-240813. Therefore, though not closely described, representative examples of the oxidizing polymer are olefin resins having tertiary carbon atoms (e.g., polypropylene, polybutene-1, or copolymers thereof), thermoplastic polyester and aliphatic polyamide; xylylene group-containing polyamide resins; and ethylenically unsaturated group-containing polymers (e.g., polymers derived from a polyene such as butadiene). As the transition metal catalyst, further, there can be exemplified inorganic salts of transition metals such as iron cobalt and nickel, organic acid salts and complexes.

The oxygen-barrier layer and the oxygen-absorbing layer are formed in suitable thicknesses to exhibit desired oxygen shut-off property.

When the oxygen-barrier layer or the oxygen-absorbing layer is used as the intermediate layer, it is desired that the intermediate layer is provided via adhesive resin layers in order to improve adhesiveness to the inner and outer layers and to prevent delamination. This makes it possible to firmly adhere and fix the intermediate layer to the inner and outer layers. The adhesive resin used for forming the adhesive resin layers have been known per se. For example, there can be used, as the adhesive resin, a resin that contains carbonyl groups (>C=O) in the main chains or in the side chains in an amount of 1 to 100 meq/100 g of the resin and, specifically, 10 to 100 meq/100 g of the resin. Concrete examples thereof are olefin resins graft-modified with a carboxylic acid such as maleic acid, itaconic acid or fumaric acid, or with an anhydride thereof, an amide thereof or an ester thereof; ethylene-acrylic acid copolymer; ionically cross-linked olefin copolymer; and ethylene-vinyl acetate copolymer. The adhesive resin layer may have such a thickness as to assure a suitable degree of adhesive force.

In the invention, if the inner layer of the container is formed by using the olefin resin, it is desired that the outer layer on the side opposite to the inner surface is formed by using the same olefin resin as the one that forms the inner surface of the container from the standpoint of utilizing properties of the olefin resin (e.g., squeeze-out property for quickly discharging the viscous content). As required, further, it is also allowable to form the outer layer by using other thermoplastic resin that is capable of forming a film depending on the use of the container, for example, by using a polyester resin such as polyethylene terephthalate (PET), polyethylene naphthalate (PEN), polyethylene isophthalate or a copolymer thereof.

In the above multilayered structure, further, there can be formed, as any one of the multiplicity of layers, a reground resin layer by mixing the scrap resin generated in forming the containers into a virgin resin for forming the outermost layer. From the standpoint of maintaining formability while reusing the resource, in this case, the amount of the scrap resin is about 10 to about 60 parts by weight per 100 parts by weight of the virgin resin for forming the outer layer (e.g., olefin resin or polyester resin).

The thickness of the reground resin layer varies depending on the size of the container or the kind of the content, and is such that the total thickness of the container wall does not become unnecessarily large and that the scrap resin can be effectively used.

Further, the container used in the invention can assume a variety of forms provided an oil film can be formed on the inner surface of the container as will be described later and the viscous content can be discharged without being interrupted. For instance, the container may assume a form depending on the material of the container, such as cup, bottle, bag (pouch), syringe, pot, tray, can and the like, and may have been stretch-formed.

The container, depending on its form, is formed by a method known per se. Specifically, in the case of a plastic container, a preform of a layer structure including the above-mentioned layers is formed by a method known per se., and to which a film is stuck by heat-sealing, or which is put to the after-treatment such as vacuum-forming like plug-assist forming, or blow-forming to form the preform into a container.

FIG. 1 is a view of a directly blow-formed bottle which is the most preferred embodiment of the container used in the invention.

In FIG. 1, the bottle generally designated at 10 includes a neck portion 11 forming a screw thread, a body wall 15 continuous to the neck portion 11 via a shoulder portion 13, and a bottom wall 17 closing the lower end of the body wall 15. An oil film that will be described below is formed in the bottle 10 which is then filled with a viscous content.

<Forming the Oil Film>

In the invention, prior to filling the container having the above-mentioned structure with a viscous content, the oil film is formed on the inner surface of the container. Upon forming the oil film on the inner surface of the container, it is made possible to discharge the viscous content filled in the container quickly and completely without permitting the content to adhere and remain on the container wall.

Namely, with the inner surface of the container serving as the oil film, the viscous content is discharged in a state of liquid-liquid contact. That is, the viscous content does not come in contact with the inner surface of the container, does not adhere to the inner surface of the container, and is, therefore, allowed to be discharged quickly and completely.

The oil film is formed by using an edible oil or a liquid paraffin (hereinafter, they are called oily liquids).

The oily liquid is a non-volatile liquid having a small vapor pressure under atmospheric pressure and having a viscosity which is high to a suitable extent, does not easily flow down from the inner surface of the container, has a small angle of contact to the thermoplastic resin forming the inner surface of the container and, specifically, to the olefin resin or the polyester resin, tends to form a film uniformly spreading over the inner surface of the container, exhibits a high degree of repellency to a viscous content that contains much water, and exhibits a high degree of slipping property to the viscous content. For instance, other substances cause inconveniences such as volatilizing in the atmospheric pressure, flowing down from the inner surface of the container, mixing with the content, not being capable of forming a film, or causing the quality of the content to be greatly deteriorated despite they have formed the film.

Among the oily liquids used in the invention, examples of the edible oil include soy bean oil, rape oil, olive oil, rice oil, corn oil, safflower oil, sesame oil, palm oil, castor oil, avocado oil, coconut oil, almond oil, walnut oil, hazel oil, salad oil, etc. They can be also used being mixed together. Depending on the kind of the edible oil, further, a film may not often be formed as it mixes into the content. In such a case, the oily liquid that is not miscible with the content may be used being selected out of other edible oils or liquid paraffins.

Two or more kinds of the oily liquids may be mixed together to form the oil film. Or an additive such as interface lubricating agent like ester of fatty acid or ether of fatty acid may be suitably added so far as it does not affect properties such as slipping property expressed by the oil film.

Depending on the kind of the thermoplastic resin forming the inner surface of the container, further, the oily liquid having a small angle of contact to the inner surface, e.g., having a contact of angle to the bottle inner surface of not larger than 38 degrees and, specifically, not larger than 25 degrees may be used being selected out of the edible oils or liquid paraffins.

By using the above oily liquid, the oil film is easily formed by such means as a spraying method using a spray pipe or a dipping method depending on the form of the container.

The oil film is formed by using the oily liquid in an amount of, usually, 5 to 60 $g/m^2$ and, specifically, 5 to 30 $g/m^2$. This is because if the amount of the oil is too small, surface properties cannot be imparted to a sufficient degree. If the amount of the oil is too large, on the other hand, the liquid tends to be removed and, hence, the amount of the liquid greatly varies making it difficult to stably maintain the properties.

<Filling the Content>

In the invention, after the oil film of edible oil or liquid paraffin is formed as described above, the viscous content is quickly filled.

In the field of containers, in general, the container manufacturer produces the containers and the user who has purchased the containers fills the contents. Here, however, if the container manufacturer forms the oil film on the inner surfaces of the containers and, thereafter, if the user fills the contents, then a considerable period of time might have been elapsed from the formation of the oil film until the contents are filled. As a result, it often might be such that the amount of the film has been decreased already, properties of the oil film have been deteriorated, the content is not steadily ejected as desired and, hence, properties of the oil film are not stably exhibited. According to the present invention, on the other hand, the user forms the oil film and readily fills the viscous content (usually within one minute) through a series of steps. Therefore, the oil film is held on the inner surface of the container by the viscous content, and properties of the oil film are stably exhibited.

The viscous content may be filled by means known per se. or may be filled at normal temperature. Or some kinds of foods may be hot-filled thereby also effecting the sterilization.

After the content is filled, a lid is fitted to the container to seal it. The containers are, thereafter, sold to general consumers.

Referring, for example, to the bottle of FIG. 1, a metal foil 19 such as aluminum foil is fitted by heat-sealing to the opening at the upper end of the neck portion 11, a predetermined cap 20 is fitted thereto, and the thus obtained packed container (bottle) is put to sale. After having purchased the packed bottle, the cap 20 is unsealed, the metal foil 19 coated with a sealing material is removed, and the bottle 10 is tilted or inverted to take out the viscous content by, as required, squeezing the body wall 15. The bottle 10 has the body wall 15 that can be squeezed. Therefore, even a paste-like viscous content that is very sticky can be easily discharged.

EXAMPLES

The invention will now be described by way of Examples.

In Examples and Comparative Examples, various properties were measured and evaluated by the methods described below.

<Measuring the Angle of Contact>

Flat portions were cut out in squares of 3 cm×3 cm from the plastic bottles of before being applied with the oil used in Examples and Comparative Examples. The oil to be used for forming the oil film was dropped in an amount of 10 mg on the upwardly facing inner surfaces of the flat portions, and the angles of contact were measured at 23° C., 50% RH by using a contact angle-measuring instrument (DropMaster 700 manufactured by Kyowa Kaimen Kagaku Co.).

<Evaluating the Slide-down Property>

Bottles filled with the content according to Examples and Comparative Examples were stored at 23° C. for one week. The bottles stored for one week were pushed on their body portions to take out the contents through the bottle mouth portion up to their last drop. Thereafter, the air was introduced into the bottles to restore their shapes.

Next, the bottles were stored in an inverted state (mouth portion down) in a refrigerator for one day. Thereafter, the degree the content that has slid down along the body wall of the bottle (the degree the content has not been adhered on the body wall) was measured, and the rate of the content that has slid down was calculated according to the following formula, Rate of content slid down (%)=(surface area on which the content is sliding down/surface area of the bottle body wall)×100

From the rates of content slid down calculated above, the slide-down property was evaluated on the following basis.

⊚: The rate of content slid down is not less than 90%.

◯: The rate of content slid down is not less than 70% but is less than 90%.

Δ: The rate of content slid down is not less than 50% but is less than 70%.

X: The rate of content slid down is less than 50%.

<Evaluating the Appearance of the Ejected Content>

Bottles filled with the content according to Examples and Comparative Examples were stored at 23° C. for one week. The bottles stored for one week were pushed on their body portions to eject the contents onto glass plates each in an amount of 15 g. The ejected contents assumed the layer form with a transparent oil film being formed on the outer side of the contents. Maximum lengths from the outer ends of the contents to the ends of the oil films were measured on the glass plates, and were evaluated on the following basis.

⊚: Maximum length is less than 0.5 mm.

◯: Maximum length is not less than 0.5 mm but is less than 1.0 mm.

Δ: Maximum length is not less than 1.0 mm but is less than 2.0 mm.

X: Maximum length is not less than 2.0 mm.

Described below are oily liquids for forming oil films and bleeding additives used in Examples and Comparative Examples.

Oily liquids;

Edible oil A: salad oil to which an intermediate chain fatty acid is added (viscosity, 50 mPa·s (25° C.))

Edible oil B: salad oil free of intermediate chain fatty acid (viscosity, 80 mPa·s (25° C.))

Liquid paraffin C: viscosity, 5.0 mm2/S (37° C.)

Liquid paraffin D: viscosity, 36.0 mm2/S (37° C.)

Bleeding additives;

Lubricant A: intermediate chain fatty acid triglyceride (ester of fatty acid)

Lubricant B: oleic amide (fatty acid amide)

Example 1

By using four extruders, a four-kind-five-layer parison was formed. The multilayered parison was then directly blow-formed to obtain the following four-kind-five-layer plastic bottle (volume: 400 ml) of a shape shown in FIG. 1.

Outer layer(90 μm)/adhesive resin layer(2.4 μm)/gas barrier layer(10 μm)/adhesive resin layer(2.4 μm)/inner layer(195.2 μm)

Specifications of the layers were as described below.

Outer layer; low-density polyethylene (LDPE)

MFR: 0.3 g/10 min. (190° C., 2.16 Kg)

Density: 0.922 g/cm$^3$

Lubricant (0.03% by weight of oleic amide per LDPE)

Adhesive resin layer; acid anhydride-modified polyethylene

Gas barrier layer; EVOH copolymer

Density: 1.19 g/cm$^3$

Tg: 61° C.

Inner layer; low-density polyethylene (LDPE)

MFR: 0.3 g/10 min. (190° C., 2.16 Kg)

Density: 0.922 g/cm$^3$

The edible oil A was used as the oily liquid for forming the oil film. A spray nozzle was inserted in the plastic bottle down to the bottom thereof and was pulled up while spraying the edible oil A such that the edible oil A was applied onto the whole side wall surface from the bottom of the bottle to form the oil film therein (amount of oil application, 15 g/m$^2$).

The angle of contact of the edible oil A to the inner surface of the bottle was 18 degrees.

The plastic bottle forming the film of the edible oil A on the inner surface thereof was filled with the content, i.e., filled with 400 g of mayonnaise (having a viscosity at 25° C. of 4000 mPa·s) containing 34% of lipid component. The mouth portion of the bottle was heat-sealed with an aluminum foil and was closely sealed with a cap to obtain a filled bottle.

The bottle was evaluated for its slide-down property and appearance of the ejected content. Table 1 shows the results thereof together with the angle of contact of the oil film (edible oil A) to the inner surface of the bottle.

Example 2

A plastic bottle was produced, an oil film was formed therein, a filled bottle was obtained by filling the bottle with the content and was evaluated all in the same manner as in Example 1 but changing the oily liquid for forming the oil film into the edible oil B. Table 1 shows the results of evaluation.

Example 3

A plastic bottle was produced, an oil film was formed therein, a filled bottle was obtained by filling the bottle with the content and was evaluated all in the same manner as in Example 1 but changing the oily liquid for forming the oil film into the liquid paraffin C. Table 1 shows the results of evaluation.

Example 4

A plastic bottle was produced, an oil film was formed therein, a filled bottle was obtained by filling the bottle with the content and was evaluated all in the same manner as in Example 1 but changing the oily liquid for forming the oil film into the liquid paraffin D. Table 1 shows the results of evaluation.

Example 5

A plastic bottle was produced, an oil film was formed therein, a filled bottle was obtained by filling the bottle with the content and was evaluated all in the same manner as in Example 1 but applying the edible oil in an amount of 5 $g/m^2$. Table 1 shows the results of evaluation.

Example 6

A plastic bottle was produced, an oil film was formed therein, a filled bottle was obtained by filling the bottle with the content and was evaluated all in the same manner as in Example 1 but applying the edible oil in an amount of 30 $g/m^2$. Table 1 shows the results of evaluation.

Example 7

A plastic bottle was produced, an oil film was formed therein, a filled bottle was obtained by filling the bottle with the content and was evaluated all in the same manner as in Example 1 but applying the edible oil in an amount of 60 $g/m^2$. Table 1 shows the results of evaluation.

Example 8

A plastic bottle was produced, an oil film was formed therein, a filled bottle was obtained by filling the bottle with the content and was evaluated all in the same manner as in Example 1 but forming the inner layer of the bottle by using the LDPE containing the lubricant A as the bleeding additive (content of the lubricant, 2.0% by weight per the LDPE). Table 1 shows the results of evaluation.

Example 9

A plastic bottle was produced, an oil film was formed therein, a filled bottle was obtained by filling the bottle with the content and was evaluated all in the same manner as in Example 1 but forming the inner layer of the bottle by using the following cyclic olefin resin (COC). Table 1 shows the results of evaluation.

Cyclic olefin resin (COC);
  Ethylene-tetracyclododecene copolymer
  MFR: 30 g/10 min (260° C., 2.16 Kg)
  Density: 1.02 $g/cm^3$
  Tg: 80° C.

Example 10

A plastic bottle was produced, an oil film was formed therein, a filled bottle was obtained by filling the bottle with the content and was evaluated all in the same manner as in Example 1 but forming the inner layer of the bottle by using the COC containing the lubricant A as the bleeding additive (content of the lubricant, 2.0% by weight per the COC). Table 1 shows the results of evaluation.

Example 11

A plastic bottle was produced, an oil film was formed therein, a filled bottle was obtained by filling the bottle with the content and was evaluated all in the same manner as in Example 1 but forming the inner layer of the bottle by using the LDPE containing the lubricant B as the bleeding additive (content of the lubricant, 0.5% by weight per the LDPE). Table 1 shows the results of evaluation.

Example 12

A plastic bottle was produced, an oil film was formed therein, a filled bottle was obtained by filling the bottle with the content and was evaluated all in the same manner as in Example 1 but changing the content filled in the plastic bottle into a mayonnaise (viscosity at 25° C. of 2000 mPa·s) containing 14% of lipid component. Table 1 shows the results of evaluation.

Example 13

A plastic bottle was produced, an oil film was formed therein, a filled bottle was obtained by filling the bottle with the content and was evaluated all in the same manner as in Example 1 but changing the content filled in the plastic bottle into a mayonnaise (viscosity at 25° C. of 8000 mPa·s) containing 75% of lipid component. Table 1 shows the results of evaluation.

Example 14

A plastic bottle was produced, an oil film was formed therein, a filled bottle was obtained by filling the bottle with the content and was evaluated all in the same manner as in Example 1 but changing the content filled in the plastic bottle into a Semi-sweet sauce (viscosity at 25° C. of 800 mPa·s) containing 0% of lipid component. Table 1 shows the results of evaluation.

Example 15

A plastic bottle was produced, an oil film was formed therein, a filled bottle was obtained by filling the bottle with the content and was evaluated all in the same manner as in Example 1 but changing the content filled in the plastic bottle into a ketchup (viscosity at 25° C. of 2000 mPa·s) containing 0% of lipid component. Table 1 shows the results of evaluation.

Comparative Example 1

A plastic bottle was produced and a filled bottle was obtained by filling the bottle with the content in the same manner as in Example 1 but without coating the inner surface of the plastic bottle with the oily liquid for forming the oil film and, therefore, without forming the oil film. Table 1 shows the results of evaluation.

TABLE 1

|  | Innermost layer of bottle | Oil film Kind | Amount (g/m²) | Angle of contact (degrees) | Evaluation *1 | *2 | *3 |
|---|---|---|---|---|---|---|---|
| Ex. 1 | LDPE | edible oil A | 15 | 18 | *4 (34%) | ○ | ○ |
| 2 | LDPE | edible oil B | 15 | 18 | *4 (34%) | ○ | ○ |
| 3 | LDPE | Liquid paraffin C | 15 | 5 | *4 (34%) | ◎ | ○ |
| 4 | LDPE | Liquid paraffin D | 15 | 10 | *4 (34%) | ◎ | ○ |
| 5 | LDPE | edible oil A | 5 | 18 | *4 (34%) | △ | ◎ |
| 6 | LDPE | edible oil A | 30 | 18 | *4 (34%) | ◎ | ○ |
| 7 | LDPE | edible oil A | 60 | 18 | *4 (34%) | ◎ | △ |
| 8 | lubricant A, LDPE | edible oil A | 15 | 0.5 | *4 (34%) | ◎ | ○ |
| 9 | COC | edible oil A | 15 | 25 | *4 (34%) | ○ | ○ |
| 10 | lubricant A, COC | edible oil A | 15 | 0.5 | *4 (34%) | ◎ | ○ |
| 11 | lubricant B, LDPE | edible oil A | 15 | 38 | *4 (34%) | △ | ○ |
| 12 | LDPE | edible oil A | 15 | 18 | *4 (14%) | ○ | ○ |
| 13 | LDPE | edible oil A | 15 | 18 | *4 (75%) | ◎ | ○ |
| 14 | LDPE | edible oil A | 15 | 18 | *5 (0%) | ○ | ○ |
| 15 | LDPE | edible oil A | 15 | 18 | *6 (0%) | ○ | ○ |
| Comp. Ex. 1 | LDPE | none | none | — | *4 (34%) | X | ◎ |

*1: Content (amount of lipid, %),
*2: Slip-down property,
*3: Appearance of ejected content,
*4: mayonnaise,
*5: Semi-sweet sauce,
*6: ketchup

DESCRIPTION OF REFERENCE NUMERALS

10: directly blow-formed bottle
11: neck portion
13: shoulder portion
15: body wall
17: bottom wall

The invention claimed is:

1. A method of filling a viscous content by:
providing a container that has an inner surface formed of an olefin resin;
applying an edible oil or a liquid paraffin on the inner surface of the container to form an oil film thereon; and
filling the container that has the oil film formed on the inner surface thereof with a viscous content that has a viscosity at 25° C. of not less than 100 mPa·s,
wherein the olefin resin forming the inner surface of the container is blended with a bleeding additive comprising an ester of a fatty acid.

2. The filling method according to claim 1, wherein an amount of the oil film is in a range of 5 to 60 g/m².

3. The filling method according to claim 1, wherein the olefin resin forming the inner surface of the container is blended with the ester of a fatty acid in an amount of 0.5 to 5.0 parts by weight per 100 parts by weight of the olefin resin.

4. The filling method according to claim 1, wherein the container has a multilayered structure including the inner surface layer that is formed of the olefin resin.

* * * * *